United States Patent
Hiemstra et al.

(10) Patent No.: US 10,852,697 B2
(45) Date of Patent: Dec. 1, 2020

(54) CROWN ASSEMBLY FOR WATCHES

(71) Applicant: Apple Inc., Cupertino, CA (US)

(72) Inventors: Daniel J. Hiemstra, San Jose, CA (US); Colin M. Ely, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 15/866,396

(22) Filed: Jan. 9, 2018

(65) Prior Publication Data
US 2019/0079452 A1   Mar. 14, 2019

Related U.S. Application Data (60) Provisional application No. 62/557,006, filed on Sep. 11, 2017.

(51) Int. Cl.
| | | |
|---|---|---|
| G04B 3/04 | (2006.01) | |
| G04C 3/00 | (2006.01) | |
| G04G 17/02 | (2006.01) | |
| G01D 5/347 | (2006.01) | |
| H01H 19/06 | (2006.01) | |

(52) U.S. Cl.
CPC .............. *G04B 3/041* (2013.01); *G04B 3/046* (2013.01); *G04C 3/007* (2013.01); *G04G 17/02* (2013.01); *G01D 5/3473* (2013.01); *H01H 19/06* (2013.01)

(58) Field of Classification Search
CPC ........ G04B 3/041; G04B 3/043; G04B 3/045; G04B 3/046; G04B 3/048
See application file for complete search history.

(56) References Cited

U.S. PATENT DOCUMENTS

| | | |
|---|---|---|
| 2,482,317 A | 9/1949 | Borer |
| 8,911,143 B2 | 12/2014 | Kitahara et al. |
| 10,228,656 B2 * | 3/2019 | Waeckerlin ............ G04B 3/043 |
| 2007/0279401 A1 | 12/2007 | Ramstein et al. |

(Continued)

FOREIGN PATENT DOCUMENTS

| | | |
|---|---|---|
| CN | 105339871 | 2/2016 |
| CN | 105556433 | 5/2016 |

(Continued)

OTHER PUBLICATIONS

Japanese Office Action from Japanese Patent Application No. 2018-147945, dated Aug. 9, 2019, 6 pages including English language translation.

(Continued)

*Primary Examiner* — Edwin A. Leon
*Assistant Examiner* — Jason M Collins
(74) *Attorney, Agent, or Firm* — Morgan, Lewis & Bockius LLP (57) ABSTRACT

A watch can include one or more input components, such as a crown for receiving input from a user. The crown can be an assembly of multiple parts, for example, to provide aesthetic, structural, and/or functional attributes. The parts of the crown can be assembled in a manner that resists separation during use and when subject to environmental influences. For example, the assembled parts of a crown can be resistant to separation while a user wearing the watch is swimming, bathing, or sweating. The assembly can be secured by both mechanical mechanisms and chemical mechanisms.

18 Claims, 8 Drawing Sheets

(56) References Cited

U.S. PATENT DOCUMENTS

| | | |
|---|---|---|
| 2008/0008053 A1 | 1/2008 | Zimmerman |
| 2016/0058375 A1 | 3/2016 | Rothkopf |
| 2016/0216801 A1 | 7/2016 | Shedletsky et al. |
| 2016/0313700 A1* | 10/2016 | Fraser .................. G04B 37/084 |
| 2016/0313703 A1 | 10/2016 | Ely et al. |
| 2016/0378187 A1 | 12/2016 | Moussette et al. |
| 2016/0378189 A1 | 12/2016 | Moussette et al. |
| 2017/0315508 A1* | 11/2017 | Masone .................. G04B 3/043 |
| 2018/0210397 A1* | 7/2018 | Masone .................. G04B 3/043 |
| 2018/0259906 A1* | 9/2018 | Iguchi .................... G04B 3/043 |

FOREIGN PATENT DOCUMENTS

| | | |
|---|---|---|
| CN | 105955519 | 9/2016 |
| CN | 106557218 | 4/2017 |
| CN | 206209589 | 5/2017 |
| DE | 4318758 | 8/1994 |
| EP | 2166420 | 3/2010 |
| GB | 2423379 A | 8/2006 |
| JP | S 46-025428 | 9/1971 |
| JP | 2004-138613 | 5/2004 |
| JP | 2005-127816 | 5/2005 |
| JP | 2007-532894 | 11/2007 |
| JP | 2014-059276 | 4/2014 |
| JP | 2017-053664 | 3/2017 |
| JP | 2017-508159 | 3/2017 |
| KR | 2016-0017070 | 2/2016 |
| WO | WO-2016/144919 A1 | 9/2016 |

OTHER PUBLICATIONS

Evaluation Report for Utility Model Patent Application No. 201820131941.2, dated Nov. 26, 2018, 12 pages including English language translation.

International Search Report and Written Opinion from PCT/US/ 2018, dated Jun. 5, 2018, 14 pages.

Japanese Notice of Allowance from Japanese Patent Application No. 2018-147945, dated Nov. 22, 22019, 5 pages including English language translation.

Korean Office Action from Korean Patent Application No. 2018-0097311, dated Dec. 12, 2019, 14 pages including English language translation.

Korean Notice of Allowance from Korean Application No. 2018-0097311, dated Jun. 23, 2020, 3 pages including English language translation.

* cited by examiner

CROWN ASSEMBLY FOR WATCHES

CROSS-REFERENCE TO RELATED APPLICATION

This application claims the benefit of U.S. Provisional Application No. 62/557,006, entitled "CROWN ASSEMBLY FOR WATCHES," filed Sep. 11, 2017, the entirety of which is incorporated herein by reference.

FIELD

The present description relates in general to assemblies for user input components, and more particularly to, for example and without limitation, assemblies for crowns of watches.

BACKGROUND

Portable electronic devices, such as watches, have become increasingly popular, and the features and functionality provided by portable electronic devices continue to expand to meet the needs and expectations of many consumers. User interface features are often provided on electronic devices to allow a user to provide commands for execution by the devices. Many devices include input components, such as crowns, that receive and detect tactile input from a user during operation. Such input components may be prominently featured on the device for ready access by a user.

However, a crown of a watch can be subjected to stresses and environmental influences that could weaken the crown as well as the entire watch. User activities, such as swimming, bathing, and sweating, can threaten the physical and chemical composition of the crown.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates in general to assemblies for user input components, and more particularly to, for example and without limitation, assemblies for crowns of electronic devices. An electronic device can include one or more input components, such as crowns, dials, and/or buttons, at an external surface thereof for receiving tactile input from a user. The input components can provide the user with the ability to interact with and provide instructions to the electronic device. In some instances, it may be desirable to provide a crown of multiple parts, for example, to provide aesthetic, structural, and/or functional attributes. For example, it may be desirable to provide a crown with a dial and a cap of different materials, colors, and/or surface features.

The parts of the crown can be assembled in a manner that resists separation during use and when subject to environmental influences. For example, the assembled parts of a crown can be resistant to separation while a user wearing the electronic device is swimming, bathing, or sweating. The assembly can be secured by both mechanical mechanisms (e.g., interlocking parts) and chemical mechanisms (e.g., adhesive).

Given the presence of multiple parts, an assembly process can be sensitive to each of the parts. For example, a process for assembling the parts can involve sufficiently low temperatures to avoid damaging the parts, including the most heat-sensitive one of the multiple parts. Accordingly, the assembly process and the assembled crowns described herein address the need to durably assemble multiple parts without damaging any of the parts.

According to embodiments disclosed herein, a crown for an electronic device can include a dial, a cap positioned at least partially within the dial and locked to the dial, and a support structure positioned at least partially within the cap to axially retain the cap within the dial. The cap can include an engagement channel, and the support structure can include an engagement tooth positioned at least partially within the engagement channel to secure the cap with respect to the support structure.

According to embodiments disclosed herein, a method of assembling a crown can include positioning a support structure at least partially within a dial, positioning a cap at least partially within the dial with a support tooth of the support structure within an engagement channel of the cap, and rotating the support structure with respect to the cap and the dial such that the support tooth moves within the engagement channel to retains the cap axially.

These and other embodiments are discussed below with reference to FIGS. 1-15. However, those skilled in the art will readily appreciate that the detailed description given herein with respect to these Figures is for explanatory purposes only and should not be construed as limiting.

Figure 1:
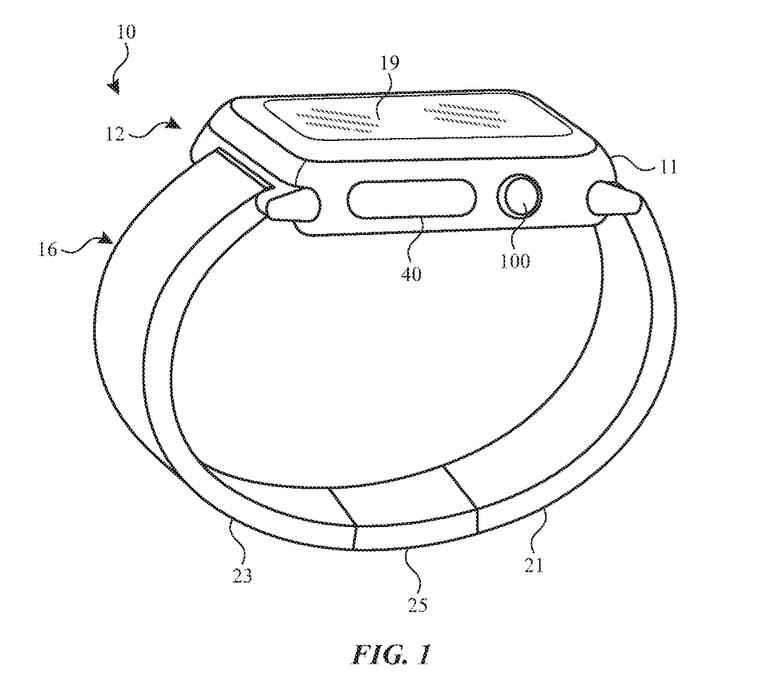
FIG. 1 shows a perspective view of an exemplary watch.

Referring to FIG. 1, an exemplary wearable electronic device, such as a watch 10, is shown. While FIG. 1 illustrates the device as the watch 10, it will be recognized that features described herein with respect to the watch 10 can be applied to a variety of other devices, such as other wearable devices, other electronic devices, portable computing devices, cell phones, smart phones, tablet computers, laptop computers, cameras, timekeeping devices, computerized glasses, and other wearable devices navigation devices, displays, sports devices, accessory devices, health-monitoring devices, medical devices, wristbands, bracelets, jewelry, and/or the like.

As shown in FIG. 1, the watch 10 includes a watch body 12 that can be attached to a user (e.g., a user's wrist) using a watch band 16. The watch band 16 includes a first band strap 21 and a second band strap 23. Free ends of the first band strap 21 and the second band strap 23 are connected with a clasp 25.

One of the components included in the watch body 12 can be one or more I/O systems. For example, a display 19 can be configured to output information about the watch body 12. The display 19 can also be configured to receive input. The display 19 can provide an image or video output for the watch 10. The display 19 can also provide an input surface for one or more input devices such as a touch sensing device, force sensing device, temperature sensing device, and/or a fingerprint sensor. The display 19 can be any size suitable for inclusion at least partially within the housing of the watch 10 and can be positioned substantially anywhere on the watch 10. The watch body 12 can include a housing 11 that supports the display 19. The housing 11 serves to surround a peripheral region of the watch body 12 as well as support the internal components of the watch body 12 in their assembled position. For example, the housing 11 encloses and supports various internal components (including for example integrated circuit chips, processors, memory devices and other circuitry) to provide computing and functional operations for the watch body 12.

The watch body 12 can also have other input mechanisms for receiving tactile input from a user. For example, the watch body 12 can include or interface with one or more input components, such as a crown 100 and/or a button 40. While FIG. 1 shows two particular types of input components, other input components are contemplated. For example, exemplary input components include crowns, buttons, dials, keys, switches, trackpads, and the like. The input component, such as the crown 100, can detect the tactile input from the user and cause the watch body 12 to perform functions. The tactile input can depress, rotate, move, tilt, flex, and/or deform the crown 100 in a manner that is detectable by the crown 100. The buttons 42 can include or be connected to one or more sensors that detect the tactile input. Sensors can include, for example, force sensors, pressure sensors, optical sensors, or proximity sensors, as discussed further herein. As shown in FIG. 1, the watch body 12 can include multiple input components, although it will be recognized that any number of input components can be provided. Where multiple input components are provided, the input components can be of the same or different types (e.g., depressable and/or rotatable).

Figure 2:
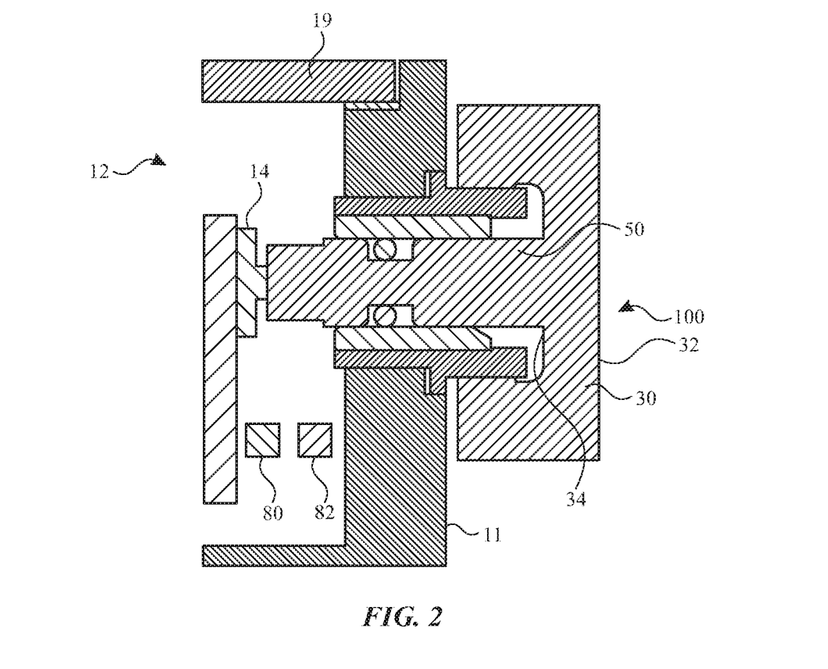
FIG. 2 shows a sectional view of a portion of the watch of FIG. 1.

Referring to FIG. 2, a crown can be provided as a component of the watch body 12 to accept translational and/or rotational input from a user. As shown in FIG. 2, a crown 100 can protrude from a surface of the housing 11. As further shown in FIG. 1, the crown 100 can be positioned on a side of the housing 11. Such a configuration allows the crown 100 to be readily accessible by a user without interfering with a user's view and usage of the display 19. For the purposes of the following description, the described crown 100 is one example of that shown and discussed above with respect to FIGS. 2-15. However, certain features of the crown 100, including the external surface geometry, can be simplified or varied with respect to aspects of the crown 100 discussed above.

The crown 100 can be used to accept rotary input from the user, which can be used to control aspects of the device. The crown 100 can be knurled or otherwise textured to improve grip with the user's finger and/or thumb.

An optical encoder can be used to detect the rotational motion of the crown 100. As shown in FIG. 2, the optical encoder can include a light source 82, a photodiode array 80, and a support structure 50. The support structure 50 can include a shaft 66 and an engagement portion 68. The optical encoder can utilize an encoding pattern (e.g., light and dark markings or stripes) disposed directly on the shaft 66 of the support structure 50. As light is emitted from the light source 82 and reflected off of the support structure 50 into the photodiode array 80, a position, rotation, rotation direction and rotation speed of the support structure 50 can be determined.

Signals or output of the optical encoder can be used to control various aspects of other components or modules of the device. For example the crown 100 can be turned by the user to scroll a display or select from a range of values. The crown 100 can be rotated to move a cursor or other type of selection mechanism from a first displayed location to a second displayed location in order to select an icon or move the selection mechanism between various icons that are output on the display. In a time keeping application, the crown 100 can also be used to adjust the position of watch hands or index digits displayed on the display of the device. The crown 100 can also be used to control the volume of a speaker, the brightness of the display screen, or control other hardware settings.

The crown 100 can also be configured to accept linear, as well as rotary, input. For example, the crown 100 can be configured to translate along an axis and relative to the housing 11 when pressed or pulled by the user. In some cases, the linear actuation can be used as additional user input. In some instances, the linear input to the crown can be combined with the rotary input to control an aspect of the device.

The watch body can include a tactile switch for accepting translational input from the user via the crown 100. In some cases, the switch 14 includes a metal dome switch that is configured to provide a tactile feedback when actuated. Once the force has been removed from the dial 30, the dome switch resiliently returns to its original position, providing a biasing force against the support structure 50 to return the dial 30 to its original position.

The crown 100 can be formed from a dial 30 that is coupled to the support structure 50. The dial 30 of the crown 100 includes an outer surface 32 that is configured to receive user input and the support structure 50 that extends from an interior surface 34 of the dial 30. In some cases, the support structure 50 and the dial 30 can be formed as a single piece. As the dial 30 rotates or moves in a particular direction and at a particular speed, the support structure 50 also rotates or moves in the same direction and with the same speed.

While the dial 30 and the support structure 50 are shown in FIG. 2 as being formed as a single piece, it will be recognized that the crown 100 can include multiple, separate parts that are joined together in an assembly process, as described further herein.

Figure 3:
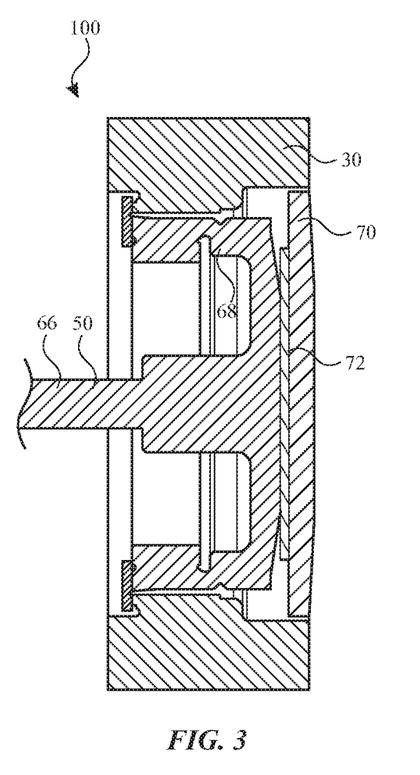
FIG. 3 shows a sectional view of an exemplary crown assembly.

Referring to FIG. 3, an assembly for a crown 100 is shown, in which a dial 30 is separate from a cap 70 of the crown 100. The cap 70 can be positioned at least partially within the dial 30. The crown 100 can further include a support structure 50 that is positioned at least partially within and coupled to the dial 30, such that, as the dial 30 rotates or moves in a particular direction and at a particular speed, the support structure 50 also rotates or moves in the same direction and with the same speed. The cap 70 can be fixed to the support structure 50 and/or the dial 30. For example, as shown in FIG. 3, the cap 70 can be bonded to the engagement portion 68 of the support structure 50 with an adhesive 72. The adhesive 72 can be positioned to join opposing surfaces of the support structure 50 and the cap 70. The adhesive 72 can include a heat-activated adhesive, such as a heat-activated film or a thermal bonding film. Such a film of adhesive 72 can be applied between the support structure 50 and the cap 70, followed by a heating process that activates the adhesive 72. It will be recognized that the description regarding the joining of the cap 70 and the support structure 50 can be applied to any two parts, such as the cap 70 and the dial 30 or the support structure 50 and the dial 30.

As shown in FIG. 3, the adhesive 72 may be the only feature retaining the cap 70 to the support structure 50. The adhesive 72 joining the support structure 50 and the cap 70 can be subject to stresses, such as shear stress, tensile stress, and/or cleavage stress. Furthermore, the adhesive 72 may be subject to chemical influences that may be encountered during user activities, such as swimming, bathing, or sweating. To strengthen the bond provided by the adhesive 72, a high-temperature curing process can be performed. However, such a process may be limited by the effect of the heat on the parts of the crown 100. For example, some adhesives 72 that provide adequate bonding require curing above temperatures that would be detrimental to the parts of the crown 100. Required temperatures can include temperatures above 60° C., 80° C., 100° C., 120° C., 140° C., 160° C., 180° C., or 200° C. Such temperatures can be detrimental to one or more parts of the crown 100. For example, anodized materials (e.g., aluminum) can be susceptible to cracking at high temperatures, such as those required for curing some adhesives. Accordingly, it can be desirable to reduce the heat requirements of an adhesive by providing an assembly that includes other (e.g., mechanical) retention mechanisms.

Figure 4:
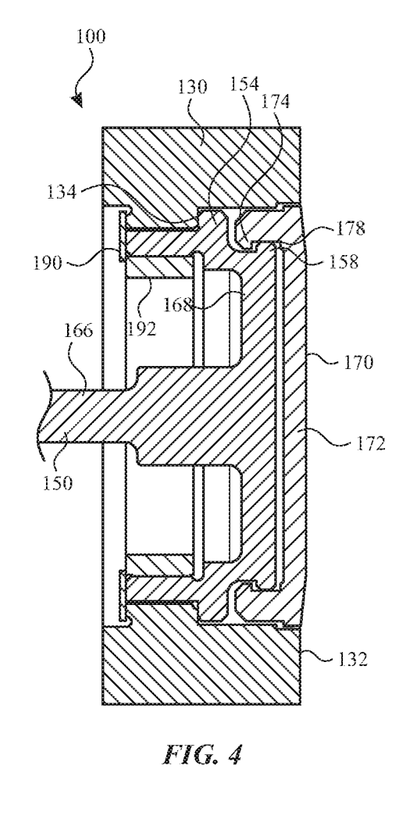
FIG. 4 shows a sectional view of an exemplary crown assembly.

Referring to FIG. 4, an assembly for a crown 100 is shown, in which a dial 130, a cap 170, and a support structure 150 are separate parts that are assembled together. The cap 170 and the support structure 150 can each be positioned at least partially within the dial 130. The support structure 150 can include a shaft 166 and an engagement portion 168. The engagement portion 168 of the support structure 150 can include one or more support teeth 154 that extend radially outwardly to interact with the dial 130. The dial 130 can include a shoulder 134 that axially abuts the support teeth 154 to limit axial movement of the support structure 150 within the dial 130. The dial 130 can also provide the support structure 150 with a range of rotational movement, as discussed further herein.

The cap 170 can be engaged by the support structure 150. For example, as shown in FIG. 4, the cap 170 can include one or more extensions 174 that extend radially inwardly and define engagement channels 178. The support structure 150 can include one or more engagement teeth 158 that extend radially outwardly and into the engagement channels 178 of the cap 170. By positioning an engagement tooth 158 within an engagement channel 178, the cap 170 can be axially retained with respect to the support structure 150 and/or the dial 130. As such, an outer surface 172 of the cap 170 can be controllably arranged and retained with respect to an outer surface 132 of the dial 130. For example, at least a portion of the outer surface 172 can be flush with at least a portion of the outer surface 132.

As further shown in FIG. 4, a bushing 192 can be provided on an inner radial surface of the support structure 150 to facilitate rotation of the support structure 150. A washer 190 can also be provided to join one or more of the dial 130, the support structure 150, and/or the bushing 192. The washer 190 can be provided on a side of the dial 130 and/or the support structure 150 that is opposite the cap 170.

While the support teeth 154 and the engagement teeth 158 are shown extending radially outwardly, it will be understood that other arrangements are contemplated, such as a portion of the support structure 150 that extends radially inwardly to a portion of the dial 130 and/or the cap 170.

As discussed herein, the dial 130, the support structure 150, and/or the cap 170 can have different composition and/or different features. For example, the dial 130, the support structure 150, and/or the cap 170 can each be of a different material than the others. Materials can include aluminum, anodized aluminum, stainless steel, titanium, another metal, a ceramic, a plastic, and/or combinations thereof. The dial 130, the support structure 150, and/or the cap 170 can each be provided with a color, texture, coating, and/or surface feature that is different than that of the others.

Figure 5:
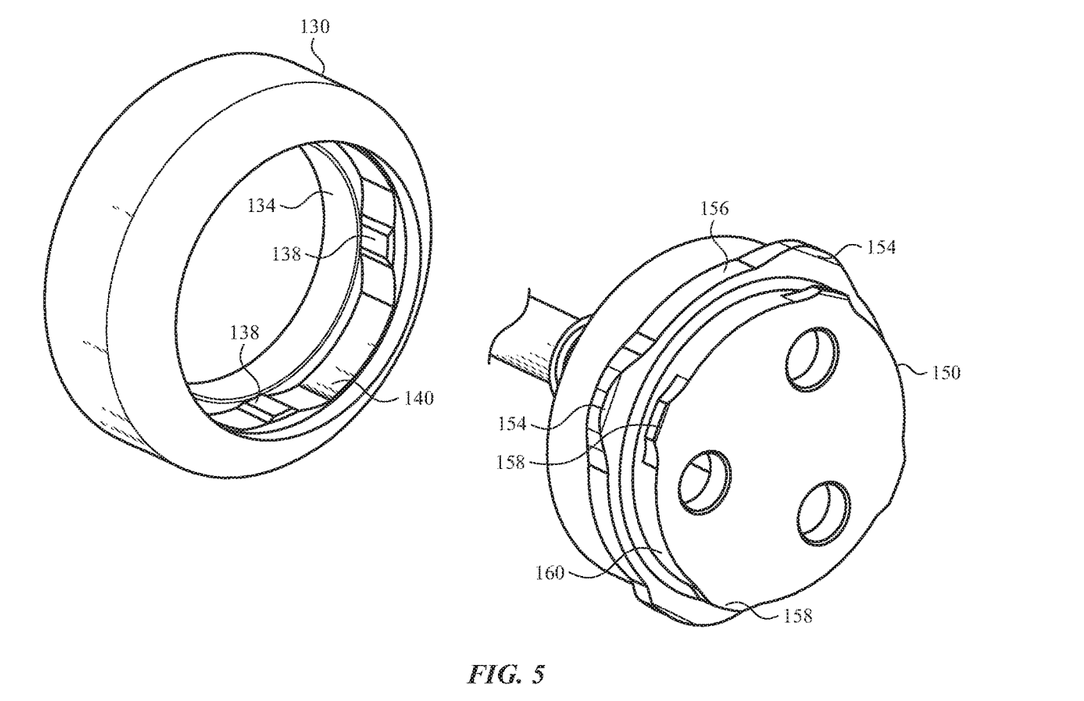
FIG. 5 shows an exploded perspective view of a portion of the crown assembly of FIG. 4.

Referring to FIG. 5, the dial 130 can include one or more features that facilitate interaction with the support structure 150 and/or the cap 170. For example, the shoulder 134 can axially abut a portion of the support structure 150 to limit axial movement of the support structure 150 within the dial 130. On one side of the shoulder 134, the dial 130 can include one or more dial teeth 138 that extend radially inwardly. The dial teeth 138 can be distributed about an inner circumference of the dial 130, with circumferentially adjacent pairs of the dial teeth 138 separated by dial recesses 140. It will be recognized that any number of dial teeth 138 and dial recesses 140 can be provided by the dial 130.

The support structure 150 can include one or more support teeth 154 that extend radially outwardly. The support teeth 154 can be distributed about an outer circumference of the support structure 150, with circumferentially adjacent pairs of the support teeth 154 separated by support structure recesses 156. It will be recognized that any number of support teeth 154 and support structure recesses 156 can be provided by the support structure 150. The support teeth 154 can be substantially smaller than the dial recesses 140 into which they can be positioned. Similarly, the support structure recesses 156 can be substantially larger than the dial teeth 138. Accordingly, the support structure 150 can be permitted a range of rotation while within the dial 130. For example, the support structure 150 can rotate within the dial 130 such that support teeth 154 move within the dial recesses 140 and the dial teeth 138 move within the support structure recesses 156 until the support teeth 154 and the dial teeth 138 contact each other.

As further shown in FIG. 5, the support structure 150 can include one or more engagement teeth 158 that extend radially outwardly. The engagement teeth 158 can be distributed about an outer circumference of the support structure 150, with circumferentially adjacent pairs of the engagement teeth 158 separated by engagement recesses 160. The engagement teeth 158 and the engagement recesses 160 can be axially offset from the support teeth 154 and the support structure recesses 156. The engagement teeth 158 can be positioned to engage at least a portion of the cap 170, as discussed further herein. It will be recognized that any number of engagement teeth 158 and engagement recesses 160 can be provided by the support structure 150.

Figure 6:
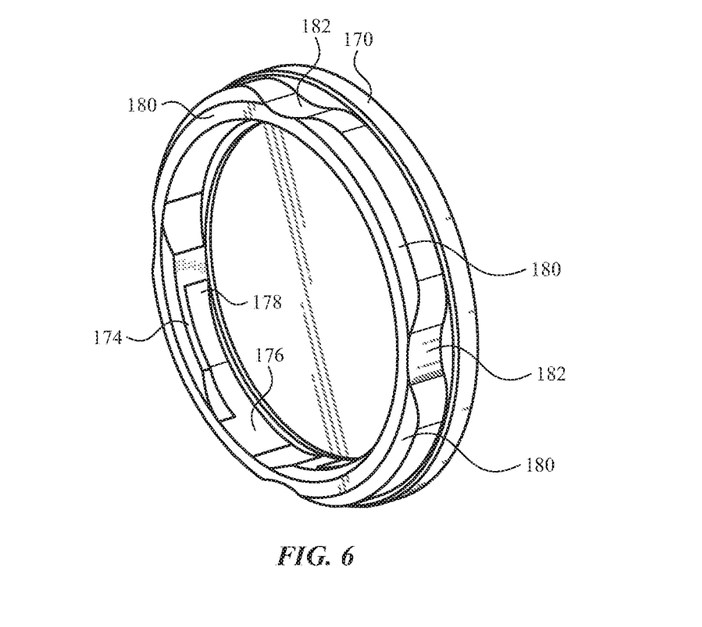
FIG. 6 shows a perspective view of an exemplary cap of the crown assembly of FIG. 4.

Referring to FIG. 6, the cap 170 can be configured to interact with both the dial 130 and the support structure 150. The cap 170 can include one or more cap teeth 180 that extend radially outwardly to lock the cap 170 with respect to the dial 130. For example, the cap teeth 180 can mate with the dial 130 so that the cap 170 maintains a rotational orientation with respect to the dial 130. The cap teeth 180 can be distributed about an outer circumference of the cap 170, with circumferentially adjacent pairs of the cap teeth 180 separated by cap recesses 182. It will be recognized that any number of cap teeth 180 and cap recesses 182 can be provided by the cap 170. The cap teeth 180 can have a size and shape that is substantially equal to a size and shape of the dial recesses 140 into which they can be positioned. Similarly, the cap recesses 182 can have a size and shape that is substantially equal to a size and shape of the dial teeth 138. Accordingly, the cap 170 and the dial 130 provide complementary shapes so that as the dial 130 rotates or moves in a particular direction and at a particular speed, the cap 170 also rotates or moves in the same direction and with the same speed.

As further shown in FIG. 6, the cap 170 can include one or more extensions 174 that extend radially inwardly and define engagement channels 178. The engagement channels 178 can extend circumferentially along an inner surface of the cap 170. Each engagement channel 178 can connect to a gap 176 that extend axially around the corresponding extension 174. The gaps 176 and the engagement channels 178 are configured to receive a corresponding engagement tooth 158 of the support structure 150, as discussed further herein.

Figure 7:
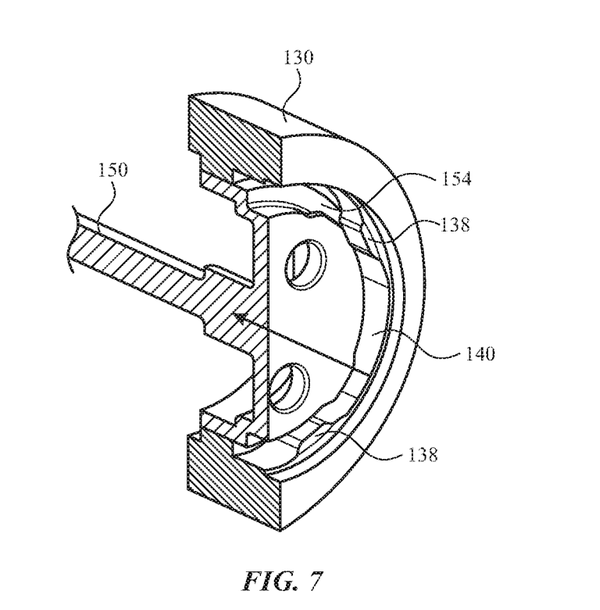
FIG. 7 shows a perspective sectional view of a ring and a support structure of an exemplary crown assembly.
Figure 8:
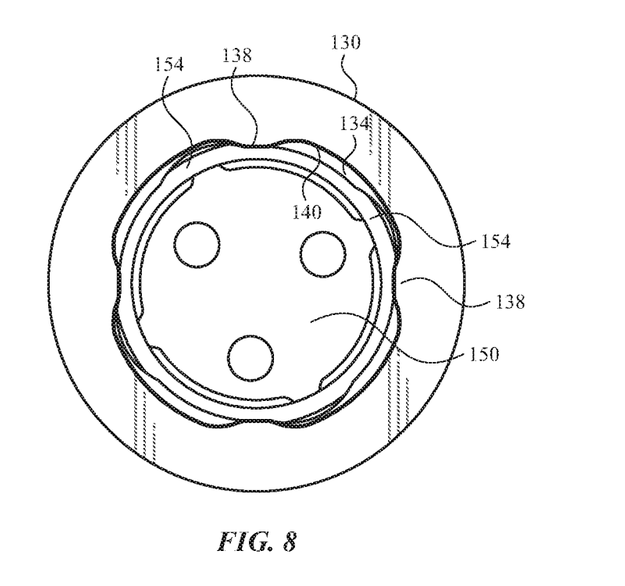
FIG. 8 shows a front view of the ring and support structure of FIG. 7.

Referring to FIGS. 7 and 8, an assembly process for a multi-part crown 100 can include positioning a support structure at least partially within a dial. The support structure 150 can be positioned within the dial 130 so that the support teeth 154 are positioned within the dial recesses 140 and the dial teeth 138 are positioned within the support structure recesses. As previously discussed, the support structure 150 is provided with a range of rotation while within the dial 130. Specifically, the support structure 150 can rotate within the dial 130 such that the support teeth 154 move within the dial recesses 140 and the dial teeth 138 move within the support structure recesses until the support teeth 154 and the dial teeth 138 contact each other. The extent of rotation can be determined by the size, shape, and/or position of the support teeth 154 and the dial teeth 138.

Figure 9:
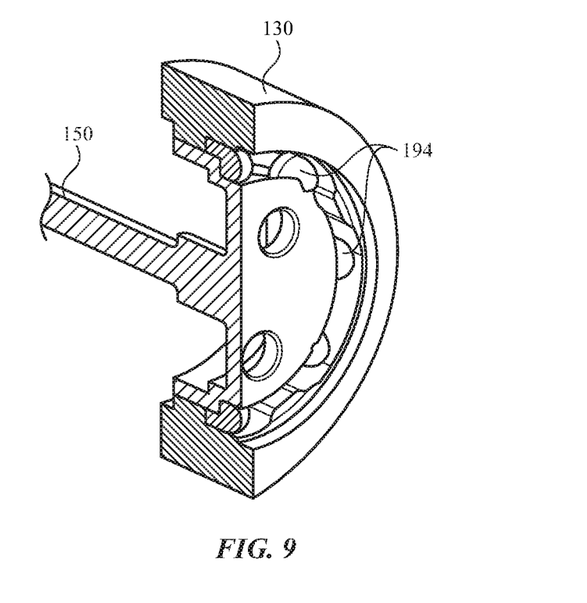
FIG. 9 shows a perspective sectional view of a ring and a support structure of an exemplary crown assembly.
Figure 10:
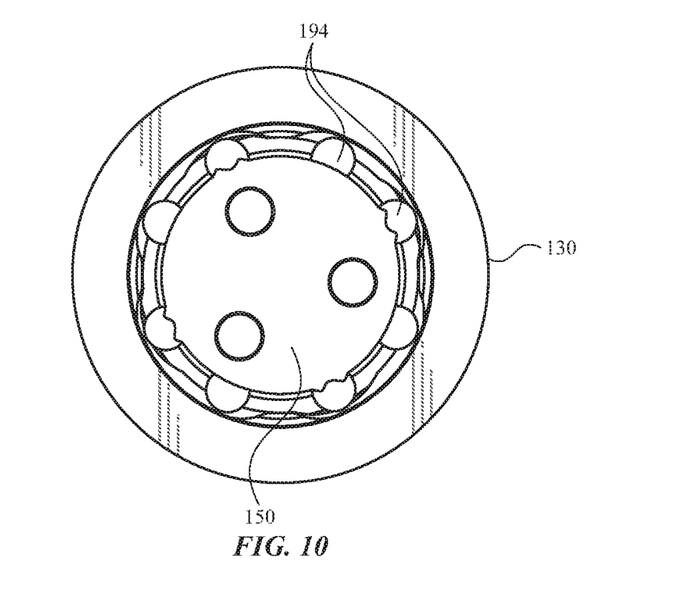
FIG. 10 shows a front view of the ring and support structure of FIG. 9.

Referring to FIGS. 9 and 10, the assembly process for the multi-part crown 100 can include applying an adhesive. The adhesive 194 can be provided between portions of the dial 130 and the support structure 150. For example, the adhesive 194 can be provided on one or more teeth of the dial 130 and/or the support structure 150. The adhesive 194 can initially be provided as a liquid and cured at a later stage of assembly. As shown in FIGS. 9 and 10, the adhesive 194 can be provided at discrete, distributed locations to be spread at a later stage.

Figure 11:
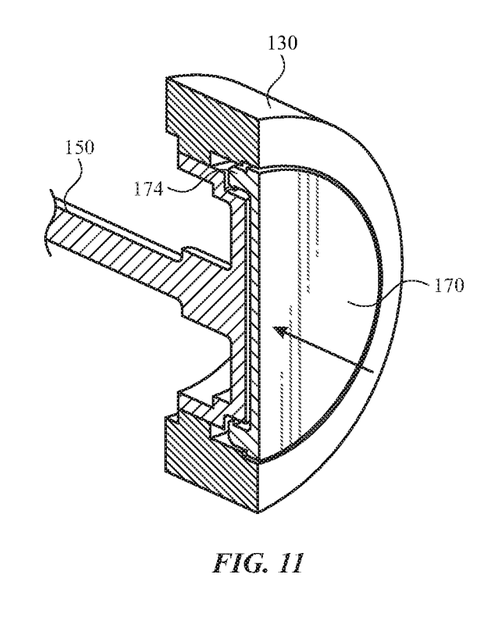
FIG. 11 shows a perspective sectional view of an exemplary crown assembly in a stage of assembly.
Figure 12:
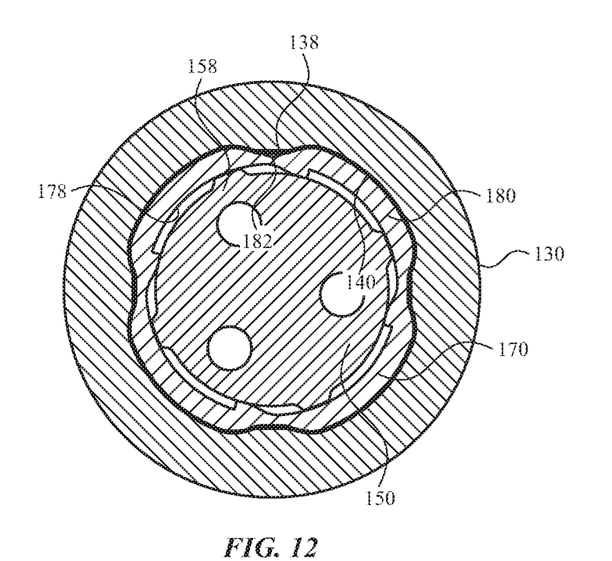
FIG. 12 shows a sectional view of the crown assembly of FIG. 11.

Referring to FIGS. 11 and 12, the assembly process for a multi-part crown 100 can include positioning a cap at least partially within the dial. The cap 170 can be positioned within the dial 130 so that the cap teeth 180 are positioned within dial recesses 140 and the dial teeth 138 are positioned within the cap recesses 182. Based on the complementary shapes of the cap teeth 180 and the dial recesses 140 and/or the dial teeth 138 and the cap recesses 182, the cap 170 can be locked in a rotational orientation with respect to the dial 130, such that when the dial 130 rotates or moves in a particular direction and at a particular speed, the cap 170 also rotates or moves in the same direction and with the same speed. The cap 170 can also be positioned within the dial 130 so that the engagement teeth 158 of the support structure 150 are positioned within engagement channels 178 of the cap 170. The engagement teeth 158 can enter into the engagement channels 178 through axial gaps of the cap 170.

Figure 13:
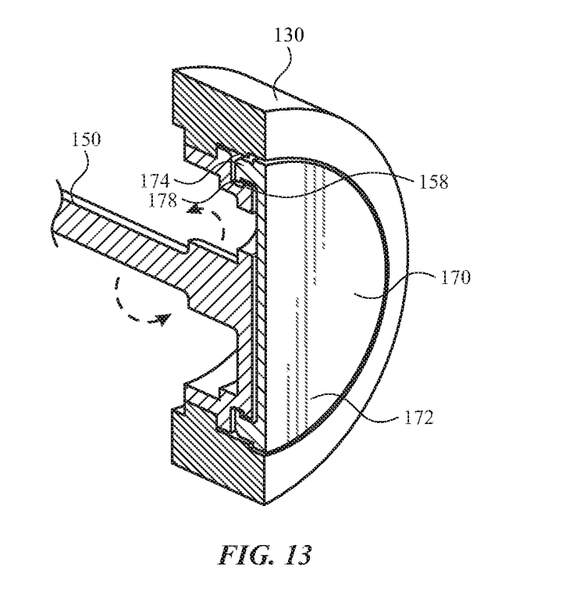
FIG. 13 shows a perspective sectional view of an exemplary crown assembly in another stage of assembly.
Figure 14:
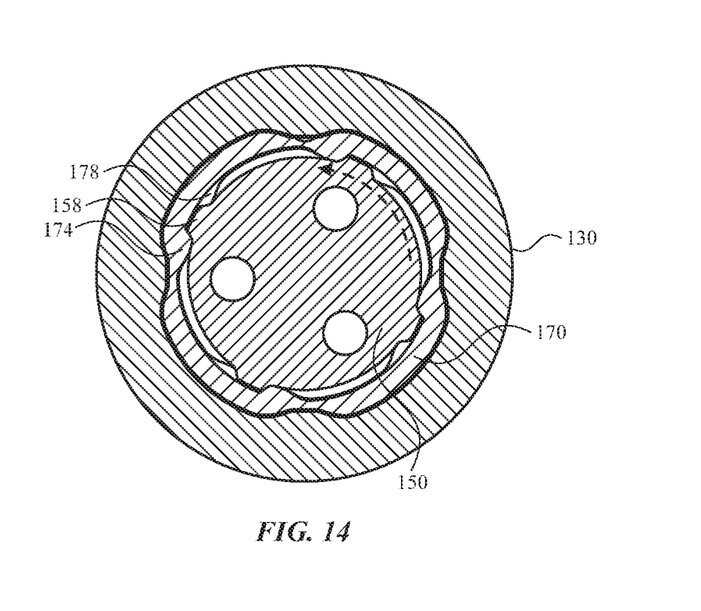
FIG. 14 shows a sectional view of the crown assembly of FIG. 13.

Referring to FIGS. 13 and 14, the assembly process for a multi-part crown 100 can include rotating the support structure with respect to the cap and the dial such that the support tooth moves within the engagement channel to retain the cap axially. As previously discussed, the support structure 150 is provided with a range of rotation while within the dial 130. The support structure 150 rotates with respect to the dial 130 and the cap 170, which are locked in a rotational orientation with respect to each other. As the support structure 150 rotates, the engagement teeth 158 of the support structure 150 move within the engagement channels 178 of the cap 170. Specifically, the engagement teeth 158 move circumferentially away from axial gaps through with the engagement teeth 158 entered the engagement channels 178. After the rotation, the engagement teeth 158 can be aligned within the engagement channels 178 and axially adjacent to extensions 174, so that the engagement teeth 158 cannot move axially out of the engagement channels 178. Accordingly, the cap 170 is axially retained with respect to the support structure 150. During and/or after the rotation, at least a portion of the outer surface 172 of the cap 170 can be flush with at least a portion of the outer surface 132 of the dial 130.

Figure 15:
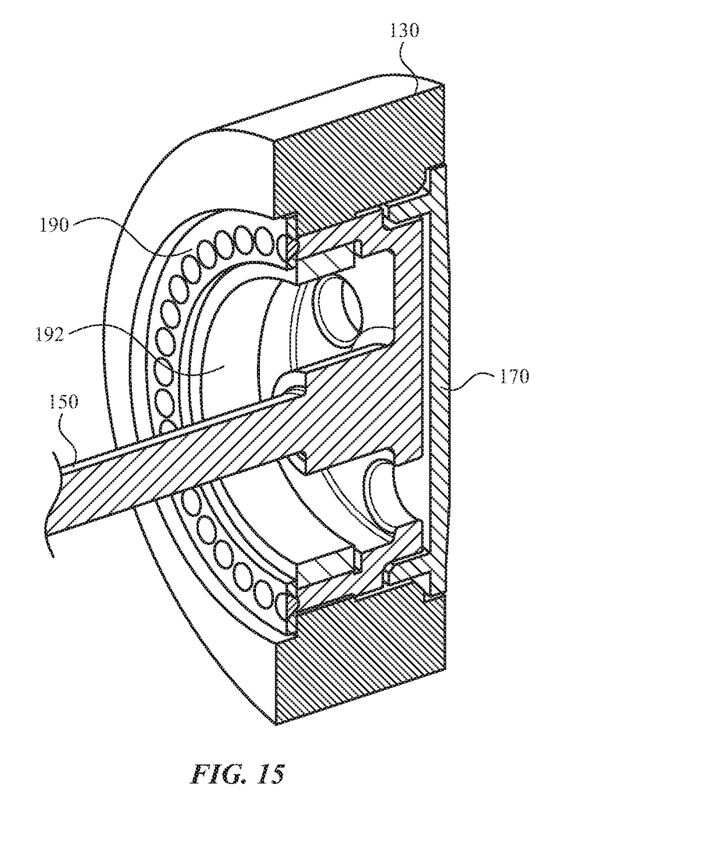
FIG. 15 shows a perspective sectional view of an exemplary crown assembly in another stage of assembly.

Referring to FIG. 15, the bushing 192 can be provided on an inner radial surface of the support structure 150 to facilitate rotation of the support structure 150. The bushing can be adhered and/or press-fit into the support structure 150. The washer 190 can also be provided to join together one or more of the dial 130, the support structure 150, and/or the bushing 192. The washer 190 can be attached, for example, by welding (e.g., laser welding) at one or more locations. The washer 190 can provide axial support to the joined parts.

In the arrangement shown in FIG. 15, the adhesive within the crown is allowed to cure, for example by a heat process. The adhesive can be spread to at least two of the dial 130, the cap 170, and the support structure 150. When the adhesive is cured, the dial 130, the cap 170, and the support structure 150 are fixed with respect to each other, such that the parts of the crown 100 move rotationally and translationally in unison. As such, forces applied by a user to the dial 130 and/or the cap 170 are conveyed to the support structure 150 for detection by the watch.

The adhesive can be fully contained within an interior of the crown 100. Based on the mechanical engagements discussed herein, the adhesive is not the only feature retaining the cap 170 to the support structure 150. For example, the engagement teeth 158 within the engagement channels 178 axially retain the cap 170 to the support structure 150. Accordingly, the adhesive need only maintain the arrangement of parts (e.g., rotational orientation of the support structure 150 and the cap 170) to maintain the assembly. This eases the bond requirement of the adhesive, and thereby allows use of an adhesive that requires a less rigorous curing process. For example, an adhesive with a lower curing temperature can be used so that the parts of the crown are not subjected to high temperatures that could be detrimental to one or more of the parts. By further example, acceptable temperatures can include temperatures below 60° C., 80° C., 100° C., 120° C., 140° C., 160° C., 180° C., or 200° C. Accordingly, the crown can be assembled in a manner that protects the integrity of the parts and securely holds the assembly together throughout a variety of stresses and environmental influences.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A crown for a watch, the crown comprising:
   a dial comprising dial teeth extending radially inwardly and separated by dial recesses;
   a cap positioned at least partially within the dial and comprising cap recesses mated with the dial teeth to rotationally lock the cap with respect to the dial, wherein an outer surface of the cap is flush with an outer surface of the dial; and a support structure positioned at least partially within the cap to axially retain the cap within the dial.

2. The crown of claim 1, wherein:

the cap further comprises:

engagement channels; and the support structure comprises:

support teeth extending radially outwardly and configured to move between adjacent pairs of the dial teeth when the support structure is rotated and configured to limit rotation of the support structure when the support teeth contact the dial teeth; and engagement teeth extending radially outwardly and within the engagement channels of the cap to axially retain the cap with respect to the support structure.

3. The crown of claim 1, wherein the watch comprise a watch body and a watch band configured to secure the watch body to a user, the crown protrudes beyond a housing of the watch body, and the crown is configured to receive a user input that is detectable by the watch body.

4. The crown of claim 1, wherein the dial and the cap are of different materials.

5. The crown of claim 1, further comprising an adhesive bonding at least two of the dial, the cap, and the support structure.

6. The crown of claim 1, further comprising a washer welded to the support structure and the dial on a side of the dial opposite the cap.

7. The crown of claim 1, wherein the cap is locked in a rotational orientation with respect to the dial.

8. A crown for a watch, the crown comprising:

a dial comprising a dial tooth;

a cap positioned at least partially within the dial and comprising:

an end portion;

an extension extending radially inwardly, the extension defining an engagement channel axially between the end portion and the extension; and a cap recess, wherein the dial tooth substantially fills the cap recess to lock the cap with respect to the dial; and a support structure comprising an engagement tooth positioned at least partially within the engagement channel of the cap to secure the cap with respect to the support structure.

9. The crown of claim 8, wherein:

the dial comprises dial teeth separated by dial recesses; and the support structure further comprises support teeth that provide the support structure with a range of rotation with respect to the dial by moving between adjacent pairs of the dial teeth.

10. The crown of claim 8, further comprising a washer welded to the support structure and the dial on a side of the dial opposite the cap.

11. The crown of claim 8, further comprising an adhesive bonding at least two of the dial, the cap, and the support structure.

12. A watch comprising:

a watch band; and a watch body comprising:

a housing; and the crown of claim 8, wherein the crown protrudes beyond the housing and is configured to detect a user input.

13. The watch of claim 12, wherein the watch body further comprises:

a switch for detecting linear movement of the crown with respect to the housing; and an optical encoder for detecting rotation of the crown with respect to the housing.

14. A method of assembling a crown, the method comprising:

positioning a support structure at least partially within a dial;

moving an engagement tooth of the support structure axially through a gap adjacent to an extension of a cap, the extension extending radially inwardly and defining an engagement channel axially between the extension and an end portion of the cap; and rotating the support structure with respect to the cap and the dial such that the engagement tooth moves into the engagement channel to retain the cap axially.

15. The method of claim 14, further comprising applying an adhesive to at least two of the dial, the cap, and the support structure.

16. The method of claim 14, wherein moving the engagement tooth comprises aligning the engagement tooth of the support structure between an adjacent pair of dial teeth of the dial to provide the support structure with a range of rotation with respect to the dial.

17. The method of claim 14, wherein positioning the cap at least partially within the dial comprises aligning a dial tooth of the dial with a cap recess of the cap to lock the cap to the dial.

18. The method of claim 14, wherein, while rotating the support structure with respect to the cap and the dial, the cap and the dial are locked with respect to each other.

* * * * *